United States Patent
Dames et al.

(10) Patent No.: US 8,607,147 B2
(45) Date of Patent: Dec. 10, 2013

(54) SYSTEM AND METHODS FOR PREVIEWING ALTERNATIVE COMPOSITIONS AND ARRANGEMENTS WHEN COMPOSING A STRICTLY-STRUCTURED FLOW DIAGRAM

(75) Inventors: Dwayne Dames, Boynton Beach, FL (US); Jeffrey S. Kobal, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 11/298,897

(22) Filed: Dec. 9, 2005

(65) Prior Publication Data

US 2007/0136351 A1  Jun. 14, 2007

(51) Int. Cl.
*G06F 3/048* (2013.01)

(52) U.S. Cl.
USPC ........... 715/764; 715/765; 715/769; 715/810; 715/853; 704/1; 345/440

(58) Field of Classification Search
USPC .............. 715/764, 765, 769, 810, 853; 704/1; 345/440
See application file for complete search history.

(56) References Cited

U.S. PATENT DOCUMENTS

| | | | | |
|---|---|---|---|---|
| 5,768,552 A * | 6/1998 | Jacoby | ........................... | 345/441 |
| 5,838,320 A * | 11/1998 | Matthews, III et al. | ........ | 715/786 |
| 5,995,918 A * | 11/1999 | Kendall et al. | ..................... | 704/1 |
| 6,111,572 A * | 8/2000 | Blair et al. | ..................... | 715/703 |
| 6,219,055 B1 * | 4/2001 | Bhargava et al. | ............. | 715/850 |
| 6,237,006 B1 * | 5/2001 | Weinberg et al. | ............. | 707/797 |
| 6,304,886 B1 * | 10/2001 | Bernardo et al. | ............. | 715/234 |
| 6,366,300 B1 * | 4/2002 | Ohara et al. | .................. | 715/771 |
| 6,535,888 B1 * | 3/2003 | Vijayan et al. | ................ | 707/706 |
| 6,674,955 B2 * | 1/2004 | Matsui et al. | ................. | 386/281 |
| 6,684,369 B1 * | 1/2004 | Bernardo et al. | ............. | 715/205 |
| 6,718,231 B2 * | 4/2004 | Konno et al. | ................ | 700/245 |
| 6,751,780 B1 * | 6/2004 | Neff et al. | ...................... | 715/247 |
| 6,795,089 B2 * | 9/2004 | Rajarajan et al. | ............. | 345/629 |

(Continued)

FOREIGN PATENT DOCUMENTS

EP  0991265  9/1999
WO  WO 2004/057439  7/2004

OTHER PUBLICATIONS

Walker, Mark H., and Eaton, Nanette. Microsoft Office Visio 2003 Inside Out. Oct. 29, 2003. Microsoft Press. pp. 33-40 and 63-69.*

(Continued)

*Primary Examiner* — Steven Sax
*Assistant Examiner* — David Choi
(74) *Attorney, Agent, or Firm* — Novak Druce Connolly Bove + Quigg LLP

(57) ABSTRACT

A system (102) for previewing changes to a structured flow diagram is provided. The system includes a user interface (110) that displays a structured flow diagram according to a predetermined visual format. The system (100) further includes a preview module (112) for generating a modified display of a portion of the structured flow diagram displayable with the user interface (110). The modified display shows a user-directed modification to the structured flow diagram by displaying the user-directed modification in a different visual format juxtaposed with portions of the structured flow diagram that remain unchanged by the user-directed modification. The modification to the structured flow diagram can thus be previewed prior to determining whether to incorporate the modification into the structured flow diagram if the system user elects to do so.

16 Claims, 6 Drawing Sheets

(56) References Cited

U.S. PATENT DOCUMENTS

| | | | |
|---|---|---|---|
| 7,080,004 B2* | 7/2006 | Wang et al. | 704/9 |
| 7,110,005 B2* | 9/2006 | Arvin et al. | 345/619 |
| 7,463,263 B2* | 12/2008 | Gilboa | 345/440 |
| 7,545,392 B2* | 6/2009 | Sprang et al. | 345/677 |
| 7,548,925 B2* | 6/2009 | Bradlee et al. | 1/1 |
| 7,631,291 B2* | 12/2009 | Shukla et al. | 717/107 |
| 2003/0025734 A1* | 2/2003 | Boose et al. | 345/765 |
| 2003/0184596 A1* | 10/2003 | Kodosky et al. | 345/810 |
| 2005/0004911 A1* | 1/2005 | Goldberg et al. | 707/7 |
| 2005/0041042 A1* | 2/2005 | Rajarajan et al. | 345/629 |
| 2005/0119892 A1* | 6/2005 | Agapi et al. | 704/270 |
| 2006/0167924 A1* | 7/2006 | Bradlee et al. | 707/102 |

OTHER PUBLICATIONS

Purdy, J.W., "How Does Java Drag-and-Drop Work?", Dr. Dobb's Journal, Nov. 1998.

Choi, J., et al., "A Design & Implementaiton of Immersive Virtual Space Authoring System", Virtual Systems & MultiMedia(VSMM'99), pp. 316-312, Sep. 1999.

Kang, H., et al., "Visualization Methods for Personal Photo Collections: Browsing & Searching in the Photofinder", IEEE Int'l Conf. on Multimedia & Expo., Aug. 2000.

Baker, M.M., "Design Mode Drag-and-Drop", Windows Q&A Newsletter, Sep. 21, 2002.

* cited by examiner

SYSTEM AND METHODS FOR PREVIEWING ALTERNATIVE COMPOSITIONS AND ARRANGEMENTS WHEN COMPOSING A STRICTLY-STRUCTURED FLOW DIAGRAM

FIELD OF THE INVENTION

The present invention is related to the field of computer-assisted design and, more particularly, computer-generated structured flow diagrams.

BACKGROUND OF THE INVENTION

Computer-assisted design, generally, refers to the activities of an engineer or other design professional in designing a system, product, or procedure using software and/or special-purpose hardware intended to facilitate the design process. Beginning with early Fortran-based computer-aided design (CAD) systems and continuing with newer ones incorporating object-oriented programming methods, CAD systems have significantly enhanced the efficiency of engineers and other design professionals.

A feature common to many such systems is the familiar Graphical User Interface (GUI), which allows a designer to succinctly represent complex features of a product or process visually. With a GUI, a designer can develop a product or process by direct manipulation of objects displayed on a computer screen, typically using a drag-and drop interface with which the designer "grabs" a predefined object or icon, "drags" the object across the computer screen, and "drops" it onto a target. A GUI having such a drag-and-drop interface allows the designer to construct a product or process while watching it evolve from conception to completion.

One of the many areas in which these techniques have been successfully employed is the design and construction of structured flow diagrams. Structured flow diagrams can be used to provide schematic illustrations of various processes and applications. One such application is a voice application, for which a structured flow diagram provides a graphical representation of expected speech responses for the particular voice application. More particularly, the structured flow diagram can provide a visual representation of the grammar employed by a particular voice application.

With structured flow diagrams, generally, the visual presentation typically comprises objects, usually represented by one or more icons, each of which are positioned and/or connected according to strict rules dictated by the particular process or application that is visually represented. A designer typically composes or modifies a structured flow diagram using a visual interface that allows the designer to "drag-and-drop" objects into desired positions within the diagram.

In a conventional system, the effect of dropping an object into a structured flow diagram is typically not realized or visually presented until the drop operation has been completed. Accordingly, if the result of the drop operation is not what the designer intended, or if the drop operation produces unanticipated changes in other portions of the structured flow diagram, the designer must "undo" the drop operation and then repeat the process until achieving a desired result. Moreover, a drag-and-drop operation may have multiple possible drop targets, each of which would have a different effect on the diagram.

To date, however, there is no effective and efficient mechanism by which a designer is able to "preview" modifications to the structured flow diagram prior to deciding whether to incorporate the modifications into the diagram. More specifically, conventional systems lack an effective and efficient mechanism with which a designer can see the effects of alternative drops by "hovering" over various drop targets. There is similarly lacking an effective and efficient mechanism by which the designer, by moving the object over different drop targets, can preview the alternative constructs that would result from a drop operation.

SUMMARY OF THE INVENTION

The present invention facilitates the design, construction, and modification of various types of strictly-structured flow diagrams. The invention applies with respect to various different strictly-structured flow diagrams used in the context of many different applications. One such application is that of a grammar builder for graphically depicting expected speech responses in a voice application.

One embodiment of the invention is a system for previewing changes to a structured flow diagram. The system can include a user interface configured to display a structured flow diagram to a user according to a predetermined visual format. The system can further include a preview module for generating a modified display of a portion of the structured flow diagram. The modified display, displayable with the user interface, can show a user-directed modification to the structured flow diagram by displaying the user-directed modification in a different visual format. Moreover, the modified portion or portions can be juxtaposed with portions of the structured flow diagram that are unchanged by the user-directed modification. Thus, the modification to the structured flow diagram can be previewed by the user prior to being incorporated into the structured flow diagram if the user elects to do so.

Another embodiment of the invention is a computer-implemented method of previewing proposed modifications to a structured flow diagram. The method can include presenting a display of the structured flow diagram with a user interface, the structured flow diagram being displayed according to a predetermined visual format. The method can further include generating a modified display of the structured flow diagram by displaying a modification in a different visual format juxtaposed with unmodified portions of the structured flow diagram.

Still another embodiment of the invention is a product comprising a computer-readable storage medium. The computer-readable storage medium, more particularly, can comprise computer instructions for presenting a display of a structured flow diagram with a user interface. The structured flow diagram can be displayed according to a predetermined visual format. The computer-readable storage medium can further include computer instructions for generating a modified display of a portion of the structured flow diagram by displaying a modification in a different visual format juxtaposed with unmodified portions of the structured flow diagram.

BRIEF DESCRIPTION OF THE DRAWINGS

There are shown in the drawings, embodiments which are presently preferred. It is to be understood, however, that the invention is not limited to the precise arrangements and instrumentalities shown.

DETAILED DESCRIPTION

The invention is directed to a system and related methods that facilitate the design, construction, and modification of strictly-structured flow diagrams. A strictly-structured flow diagram, as defined herein, is a computer-generated graphic or visual representation consisting of graphic objects, such as boxes, rectangles or other shapes, as well as connectors linking different graphic objects to one another. Strictly-structured flow diagrams provide a concise, visual depiction of physical and/or informational flows based on the arrangement of the objects and their relationship to one another as indicated by the particular connectors linking them. In the context of a voice application grammar builder, for example, the strictly-structured flow diagram depicts in a visual or graphical form an application user's expected speech responses.

Figure 1:
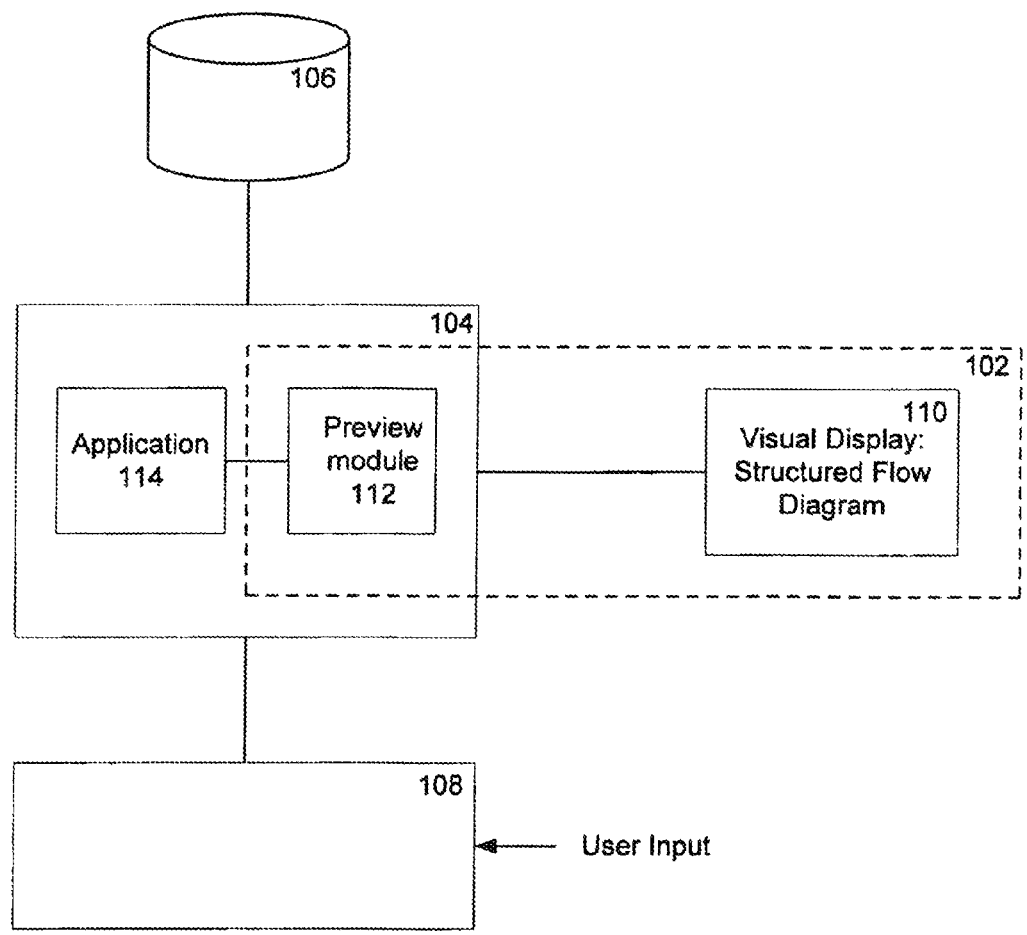
FIG. 1 is a schematic diagram of a computer-based environment that includes a system for previewing changes to a structured flow diagram, according to one embodiment of the invention.

FIG. 1 a schematic illustration of a computer-based environment 100 that includes a system 102 for previewing changes to a structured flow diagram, according to one embodiment of the invention. The computer-based environment 100 in which the system 102 is deployed illustratively includes a processing device 104 and a memory storage device 106 communicatively linked to the processing device. The computer-based environment 100 further illustratively includes an input device 108 also communicatively linked to the processing device for receiving user input. As will be readily understood by one of ordinary skill, the input device 108 can provide user-supplied input to the processing device 104, which processes the input according to a set of processing instructions that can be stored in the memory storage device 106 and/or locally in a cache or temporary memory (not shown) of the processing device.

As illustrated, each of the devices can comprise a distinct element of the computer-based environment 100. Alternatively two or more of the devices can be integrated in a single unit. As will also be readily understood by one of ordinary skill, the totality of the devices can comprise a computing device such as a general-purpose or application-specific computer.

The system 102 illustratively comprises a user interface 110 configured to display a structured flow diagram to a user according to a predetermined visual format. Additionally, the system 102 illustratively includes a preview module 112 that generates a modified display of a portion of the structured flow diagram displayable with the user interface 110. The modified display, according to the invention, is generated by the preview module so that one or more user-directed modifications to the structured flow diagram are shown.

More particularly, the preview module 112 generates the modified display so that user-directed modifications are shown in a different visual format than that of the unmodified structured flow diagram. Moreover, the modifications are juxtaposed with portions of the structured flow diagram that are unchanged by the user-directed modifications. Accordingly, modifications to the structured flow diagram can be previewed by a user prior to being incorporated into the structured flow diagram. The user can decide whether to incorporate the modifications into the structured flow diagram based on the effects of the modifications.

The juxtaposition of modifications with unmodified portions of the structured flow diagram generated by the preview module 112 encompasses various visual presentations, each characterized by presentment of a display that shows how a proposed modification would change the structured flow diagram while displaying the modification in a form that contrasts with that of the unmodified portions of the diagram. The contrast can be exhibited, for example, by different image intensities, different line drawings (e.g., solid versus broken lines), or different color combinations.

According to one embodiment, the visual format in which the preview module 112 presents the modification is characterized by a different intensity or brightness than that of the unmodified portions of the structured flow diagram. Accordingly, the modification can be juxtaposed with unmodified portions of the structured flow diagram by appearing to overlie or underlie the portions of the structured flow diagram that would be changed by the modification. If the intensity or brightness of the modification is greater than that of the unmodified structured flow diagram, then modification can appear, albeit in two dimensions, to underlie the portion of the diagram where the proposed modification would be made. Conversely if the intensity or brightness of the modification is less than that of the unmodified structured flow diagram, then the modification can appear to hover above or overlie the portion of the diagram where the proposed modification would be made.

In another embodiment, the preview module 112 presents the modification in a visual format characterized by broken lines that represent one or more objects and/or connections that would be inserted into the structured flow diagram at particular a position to effect a desired change in the diagram. Thus, the modification can be juxtaposed with unmodified portions of the structured flow diagram by appearing as one or more broken lines, representing objects and/or connections, with the other objects and connections of the unmodified portions of the structured flow diagram rearranged and appearing as solid lines.

According to still another embodiment, the visual format in which the preview module 112 presents the modification is characterized by a different color scheme than that of the unmodified portions of the structured flow diagram. The modification, therefore, can be juxtaposed with unmodified portions of the structured flow diagram by appearing as one or more objects and/or connections in one set of colors, with the unmodified portions of the structured flow diagram rearranged and appearing in a different set of colors.

As these exemplary embodiments demonstrate, the juxtaposition of a proposed modification with unmodified portions of a structured flow diagram, as generated by the preview module 112, encompasses at least two distinct aspects: one, the position of the modification—that is, where the modification would be made—and two, the contrast of different visual formats with which the modification and the unmodified portions of the structured flow diagram, respectively, are displayed. With respect to the latter, the preview module 112 can implement various pairs of contrasting visual formats in generating displays that preview proposed modifications to a structured flow diagram. The combination of different image intensities, broken-lines and solid-lines, different color schemes represent only examples of the different possible combinations.

The preview module 112 can be implemented as computer-readable instructions or code configured to run on the processing device 104. When implemented as computer-readable code, moreover, the preview module 112 can be configured to operate cooperatively in conjunction with an existing structured flow diagram application 114, such as a grammar builder of a voice application, which also runs on the processing device 104. Alternatively, the preview module 112 can implemented in dedicated hardwired circuitry or as a combination of circuitry and computer-readable code.

According to a particular embodiment, the system 102 includes a drag-and-drop interface (not shown) that can reside on the processing device 104 to enable a user to sequentially construct and modify the structured flow diagram. In particular, the drag-and-drop interface can permit the user to select an object from a predetermined set of objects and move the selected object in relation to other objects displayed with the user interface. Moreover, the preview module 110 can comprise an event handler that tracks drag-and-drop operations performed by a user using the drag-and-drop interface.

As already noted, a particular structured flow diagram can comprise a plurality of objects and a plurality of connectors that connect different ones of the plurality of objects to one another. The preview module 110, accordingly, can be configured to generate the modified display by showing a rearrangement of the objects and connections in response to a particular modification selected by a user. More particularly, in the context of the examples described below, the user can propose to modify the structured flow diagram by selecting an object to insert into the diagram. Additionally, or alternatively, the user can propose to modify the structured flow diagram by creating a new or omitting an old connection linking two or more objects.

According to one embodiment, the objects and connections of the structured flow diagram are displayed as a plurality of solid lines. To preview a modification to the structured flow diagram, the preview module 110 generates a modified visual display that shows the resulting rearrangement of objects and/or connection as broken lines. Thus a user is able to see the modification in contrast to the unmodified display and to assess the merits of the modification before deciding whether to incorporate the modification into the structured flow diagram.

According to another embodiment, the structured flow diagram is displayed according to a pre-selected color scheme. To preview a modification to the structured flow diagram, the preview module 110 generates a modified visual display that shows the resulting rearrangement of objects and/or connections according to a color scheme different than that of the color scheme for the unmodified portions of the structured flow diagram. Again, this allows the modification to be seen in sharp contrast to the unmodified display so that the modification can be assessed before a user decides whether to incorporate the modification into the structured flow diagram.

Figure 2A:
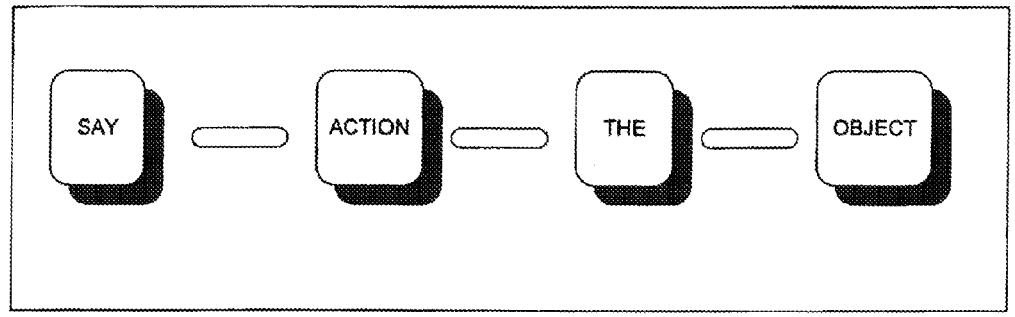
FIGS. 2A-C is exemplary visual displays of a structured flow diagram.
Figure 2B:
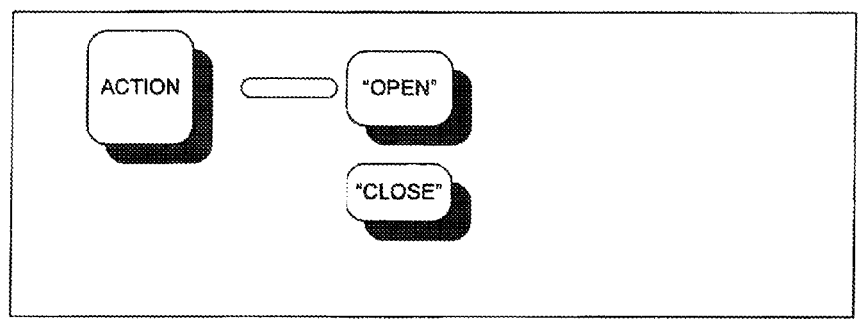
Figure 2C:
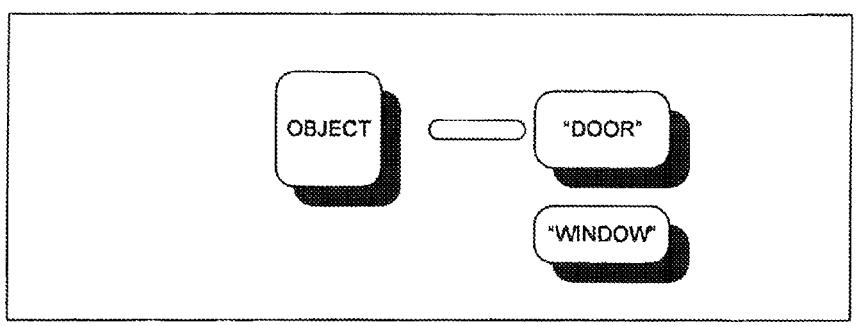

Referring additionally now to FIGS. 2A-C, exemplary structured flow diagrams generated by an existing, pre-selected grammar builder are shown. The grammar builder provides a graphical depiction of a user's expected speech response in a voice application. As illustrated in FIG. 2A, the voice application can be defined by at least one grammar rule, which is graphically represented by a token icon and at least one connector linking the token icon and another token icon. Two exemplary grammar rules are depicted in the figure: an "action" rule and an "object" rule. The action rule is depicted by the token icon denoted ACTION and the connectors immediately to the left and right of the action-designated token icon. The object rule is depicted by the token icon denoted OBJECT and the connector immediately to the left of the object-designated token icon.

FIG. 2B illustrates a visual display of a word list that corresponds to the action-designated token icon. The action word list comprises action words—illustratively, "open" and "close"—that can be used in the voice application. Similarly, FIG. 2C illustrates a visual display of a word list that corresponds to the object-designated token icon. The object word list comprises object words—illustratively, "door" and "window"—that can be used for objects in the voice application.

Figure 3A:
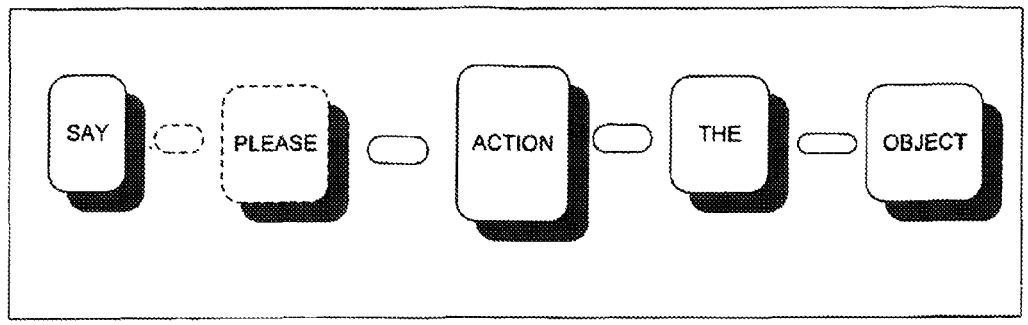
FIGS. 3A-C is visual previews of exemplary modifications to the visual displays of FIGS. 2A-C, as generated according to one embodiment of the invention.

Referring also now to FIG. 3A, an exemplary preview of a modification to the previously-described structured flow diagram is shown. The exemplary preview is generated by the preview module 112 and corresponds to a proposed modification whereby a word would be added to the action rule. The word that would be added or inserted into the rule is "please." Operatively, a user desiring to preview the effects of the modification drags the word "please" and positions it so that it hovers over the connector to the left of the token icon denoted ACTION. The preview module 112 responds to the user's action by presenting in a different visual format a word icon positioned where the word "please" would be inserted. The preview module 112 also causes the elements of the structured flow diagram to the right of the modification to shift further to the right in order to accommodate the insertion. The user is thus able to preview the modification—that is, the addition of the word "please" into the action rule—before deciding whether to incorporate the modification into the structured flow diagram.

Figure 3B:
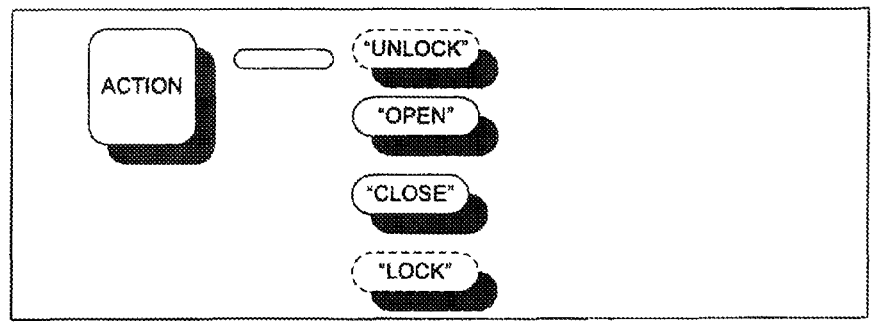

FIG. 3B illustrates a visual display of another exemplary type of modification to the grammar rules. In this particular instance, the word list corresponding to the action-designated token icon would be expanded beyond the initial words "open" and "close." The proposed modification is previewed by a user's initially dragging the words "lock" and "unlock" into a position to hover over the action-designated token icon. The preview module 112 responds to the user's action by rearranging the original list and showing, in a different visual format, the words the user proposed to add to the list. In this manner, the preview module 112 provides a preview of the proposed word list addition.

Figure 3C:
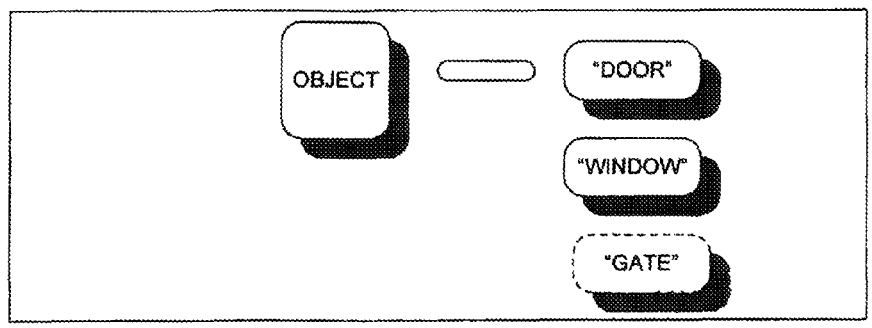

Similarly, FIG. 3C illustrates a visual display corresponding to a proposed modification for expanding the word list corresponding to the object-designated token icon. Again, the proposed modification is previewed by the user's initially dragging the proposed word, "gate," into a position to hover over the object-designated token icon. In response, the preview module 112 rearranges the original word list and shows in a distinct visual format the proposed word addition.

Figure 4A:
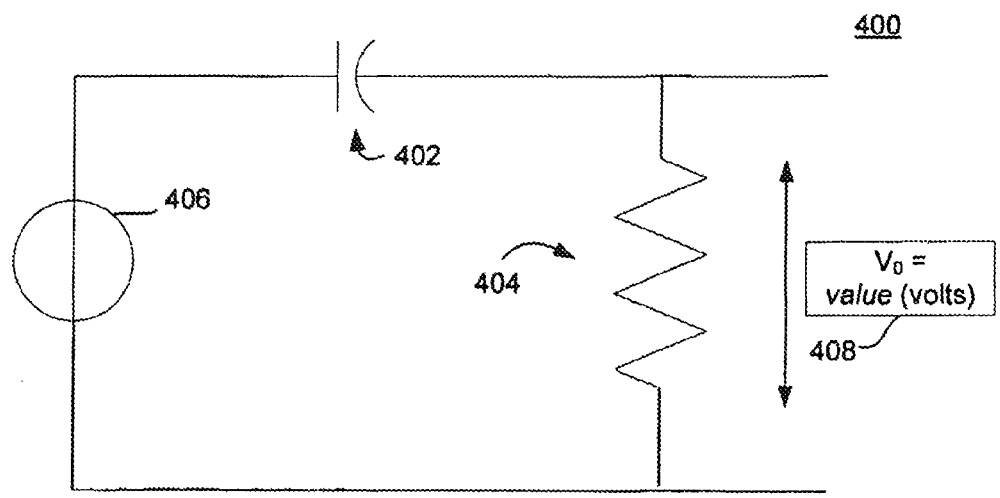
FIGS. 4A and B are visual previews of exemplary modifications of a structured schematic diagram, according to still another embodiment of the invention.
Figure 4B:
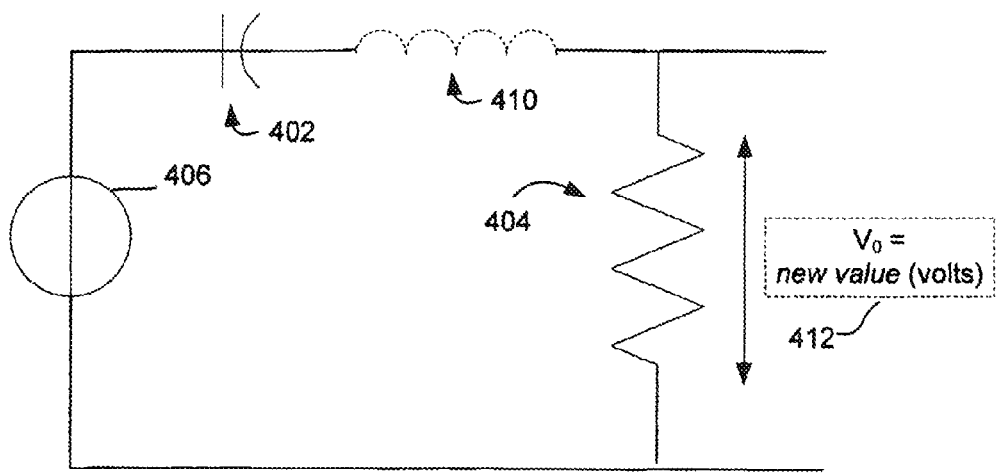

Referring now to FIGS. 4A and 4B, in an alternative embodiment, the structured flow diagram is generated by a circuit simulator that generates visual display 400. The visual display 400 can be generated in response to a user's selecting a plurality of circuit elements and specifying a plurality of connections between the circuit elements. Illustratively, the circuit displayed in FIG. 4A comprises a capacitive element 402 and resistive element 404 connected in series and electrically driven by an ideal voltage source 406. An output voltage, $V_O$, across the resistive element 404 is displayed in the box 408 adjacent to the resistive element 404. According to this embodiment, the preview module 112 is configured to preview a modification to the circuit diagram by displaying in a distinct visual format a proposed addition or deletion of circuit elements and/or a proposed change in their connections.

A preview of one such modification is illustrated in FIG. 4B, wherein the proposed modification is the insertion of an inductive element 410 that would be connected in series with the capacitive element 402 and the resistive element 404. The preview of the modification comprises the inductive element 410, which is presented in a different visual format at the proposed site of inclusion in the circuit. Optionally, the preview module 112 can be configured to display a new value for the output voltage that would result from the proposed modification. A user of the system 102 is thus able to determine the overall circuit effects of the change before adopting the proposed modification.

Figure 5:
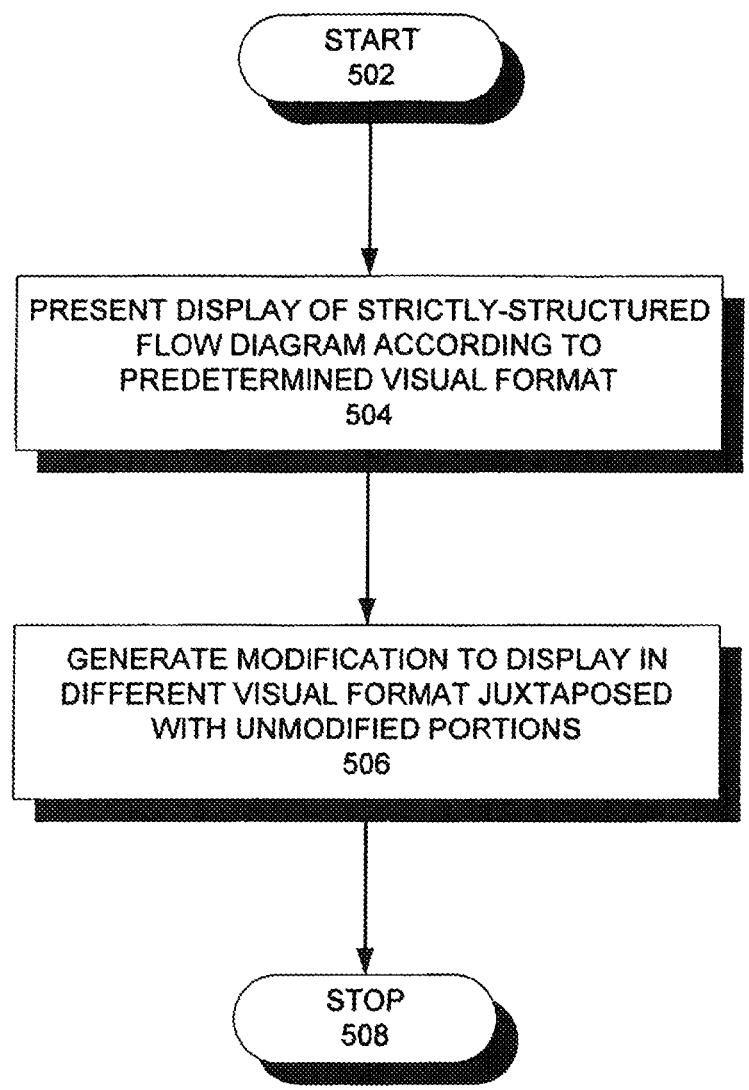
FIG. 5 is a flowchart of a method for previewing modifications to a structured flow diagram, according to yet another embodiment of the invention.

Referring now to FIG. 5, still another embodiment of the invention is a method 500 of previewing proposed modifications to a structured flow diagram. The method 500 illustratively includes, at step 504, presenting a display of the structured flow diagram using a user interface, the structured flow diagram being displayed according to a predetermined visual format. Illustratively, the method 500 further includes generating a modified display of a portion of the structured flow diagram at step 506.

More particularly at step 506, the generation of the modified display comprises displaying the modification in a different visual format, the modification being juxtaposed with unmodified portions of the structured flow diagram. As already described, on the basis of the preview of the effects of the modification in contrasting visual formats, a decision can be efficiently made—indeed, even in real time—as to whether to incorporate the modification into the structured flow diagram. The method 500 illustratively concludes at step 508.

According to one embodiment, the step 506 of generating a modified display comprises performing at least one drag-and-drop operation. The drag-and-drop operation permits the selection of an object from a predetermined set of objects and the movement of the selected object in relation to other objects in the displayed structured flow diagram.

In still another embodiment, the method 500 applies with respect to a structured flow diagram generated with a grammar builder that visually represents speech responses for a voice application. The voice application can be defined by one or more grammar rules, each represented by a token icon and at least one connector linking the token icon and another token icon. According to this particular embodiment, the step 506 of generating a modified display comprises generating a preview of an insertion of a token by positioning a token icon over a selected connector. Additionally, according to this particular embodiment, each of the one or more token icons can correspond to a list of selectable words. The step 506 of generating a modified display, therefore, can further include generating a preview of an addition to the list of selectable words by positioning an additional word over the token icon.

Figure 6:
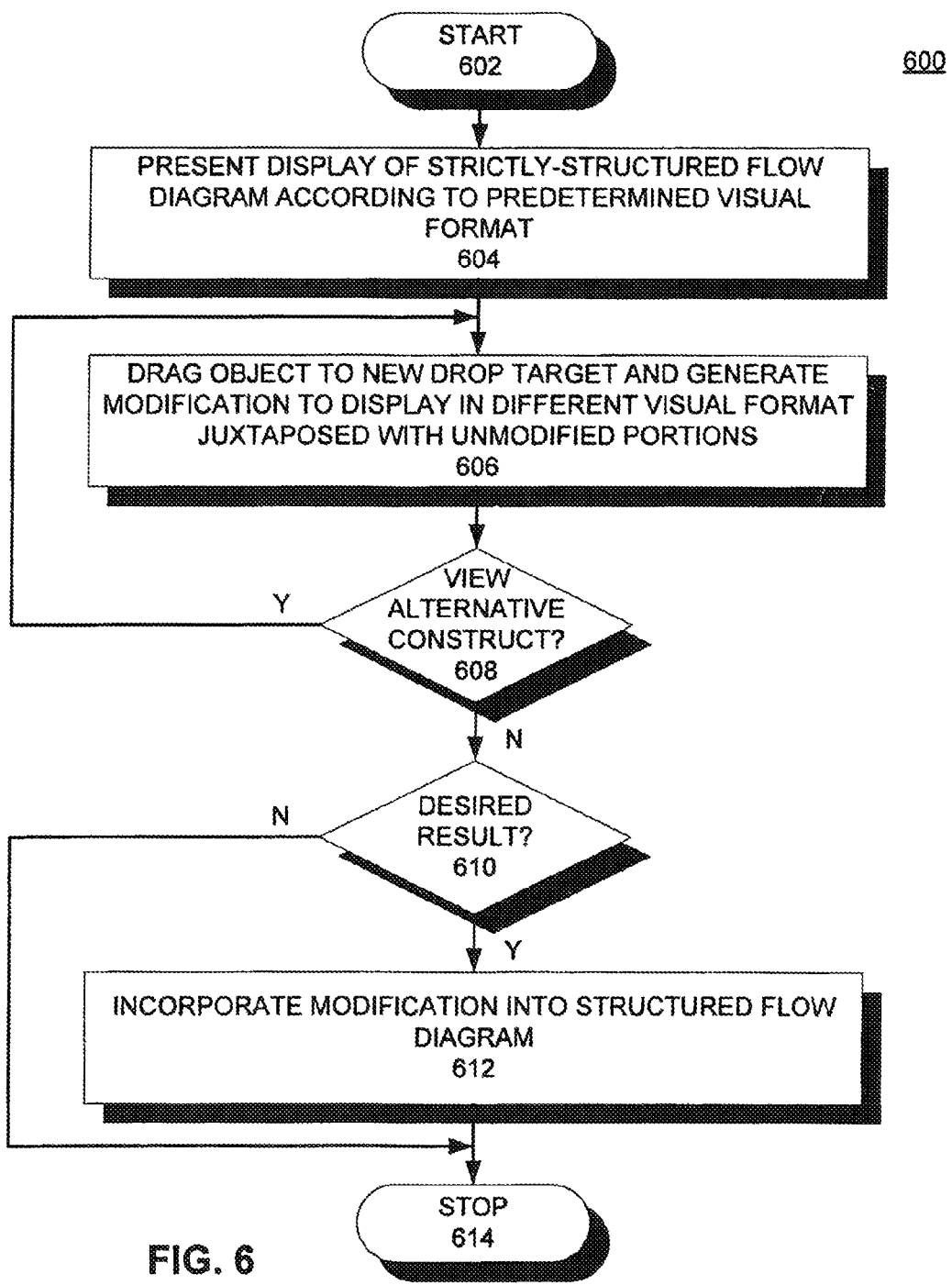
FIG. 6 is a flowchart of a method for previewing modifications to a structured flow diagram, according to still another embodiment of the invention.

FIG. 6 is a flow chart of the exemplary steps in a method 600 of previewing proposed modifications to a structured flow diagram, according to yet another embodiment. The method 600 includes, at step 604, presenting a visual display of a strictly-structured flow diagram in a predetermined visual format. At step 606, the method 600 includes dragging an object to a drop target where it is proposed that the object be inserted into the structured flow diagram, and, in response, generating a modification that is displayed in a distinct visual format juxtaposed with portions of the diagram that would not be modified by dropping the object at the proposed target. The method 600 includes, at step 608, deciding whether to consider an alternative construct of the structured flow diagram.

When an alternative construct is to be considered, the method 600 returns to step 606, and the step is repeated as described. This iterative process of moving from one drop target to another in order to preview the different effects that each proposed drop would have on the structured flow diagram can be repeated any number of times. If no further alternative constructs are to be considered, the method 600 includes deciding at step 610 whether the proposed modification that would result is desired. If it is, then the method 600 includes, at step 612, incorporation of the modification into the structured flow diagram. The method 600 illustratively concludes at step 614.

As already noted, the invention can be realized in hardware, software, or a combination of hardware and software. The invention, moreover, can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

As also noted already, the invention can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof Accordingly, reference should be made to the following claims, rather than to the foregoing specification, as indicating the scope of the invention.

We claim:

1. A computer-implemented method of previewing proposed modifications to a structured flow diagram, the method comprising:
   presenting a display of the structured flow diagram with a user interface, the structured flow diagram being displayed according to a predetermined visual format;
   dragging an object to a drop target where it is proposed that the object be inserted into the structured flow diagram;
   upon the object hovering over the proposed drop target, generating an alternative construct of the structured flow diagram that would result from the insertion of the object at the drop target in the display, wherein generating comprises showing a modification comprising one or more modified portions of the structured flow diagram due to the inserting the object at the proposed drop target in a first different visual format juxtaposed with other portions of the structured flow diagram that would not be modified by dropping the object at the proposed drop target so that the alternative construct of the structured flow diagram can be previewed prior to determining whether to incorporate the modification into the structured flow diagram at the drop target, wherein the other portions of the structured flow diagram that would not be modified by dropping the object at the proposed drop target remain being displayed in the predetermined visual format, and wherein portions of the structured flow diagram that would be modified by dropping the object at the proposed drop target are displayed in unmodified form in a second different visual format and concurrently with the modification;

dragging the object to an alternative drop target and repeating the generating step if the modification is not desired;

incorporating the modification into the structured flow diagram if the modification is desired;

wherein the predetermined visual format, the first different format, and second different visual format are of different kinds of lines or different color schemes; and wherein the structured flow diagram is a grammar builder that visually represents speech responses for a voice application defined by at least one grammar rule represented by a token icon and at least one connector linking the token icon and another token icon.

2. The method of claim 1, wherein the step of generating comprises performing at least one drag-and-drop operation whereby an object from a predetermined set of objects is selected and moved in relation to other objects in the displayed structured flow diagram.

3. The method of claim 1, wherein the step of generating comprises generating a preview of an insertion of a token by positioning a token icon over a selected connector.

4. The method of claim 1, wherein the token icon corresponds to a list of selectable words, and wherein the step of generating comprises generating a preview of an addition to the list of selectable words by positioning an additional word over the token icon.

5. A computer-implemented system for previewing changes to a structured flow diagram, the system comprising:

a display within a user interface configured to display a structured flow diagram to a user according to a predetermined visual format;

a drag-and-drop module for dragging an object to a drop target where it is proposed that the object be inserted into the structured flow diagram; and a preview module for generating, upon the object hovering over the proposed drop target, an alternative construct of the structured flow diagram that would result from the insertion of the object at the drop target in the display, wherein the generating comprises showing a modification comprising one or more modified portions of the structured flow diagram due to the inserting the object at the proposed drop target in a first different visual format juxtaposed with other portions of the structured flow diagram that would not be modified by dropping the object at the proposed target so that the alternative construct of the structured flow diagram can be previewed prior to determining whether to incorporate the modification into the structured flow diagram at the drop target, wherein the other portions of the structured flow diagram that would not be modified by dropping the object at the proposed drop target remain being displayed in the predetermined visual format, and wherein portions of the structured flow diagram that would be modified by dropping the object at the proposed drop target are displayed in unmodified form in a second different visual format and concurrently with the modification;

wherein the drag-and-drop module drags the object to an alternative drop target and the preview module generates another modification if the modification is not desired;

wherein the modification is incorporated into the structured flow diagram if the modification is desired;

wherein the predetermined visual format, the first different format, and second different visual formats are of different kinds of lines or different color schemes;

wherein the structured flow diagram is generated by a pre-selected grammar builder that generates a graphical representation of speech responses in a voice application; and wherein the voice application is defined by at least one grammar rule, the at least one grammar rule being graphically represented by a token icon and at least one connector linking the token icon and another token icon.

6. The system of claim 5, wherein the drag-and-drop interface allows a user to sequentially construct and modify the structured flow diagram by selecting an object from a predetermined set of objects and moving the selected object in relation to other objects displayed with the user interface.

7. The system of claim 6, wherein the preview module comprises an event handler that tracks drag-and-drop operations performed by a user using the drag-and-drop interface.

8. The system of claim 5, wherein the structured flow diagram comprises a plurality of objects and a plurality of connectors that connect different ones of the plurality of objects to one another, and wherein the preview module is configured to generate the modified display by showing a rearrangement of objects and connections when a user selects a modification to the structured flow diagram.

9. The system of claim 8, wherein objects and connections of the structured flow diagram are displayed as a plurality of solid lines, and wherein rearranged objects and connections are displayed as a plurality of broken lines.

10. The system of claim 8, wherein objects and connections of the structured flow diagram are displayed according to a pre-selected color scheme, and wherein rearranged objects and connections are displayed according to a different color scheme.

11. The system of claim 5, wherein the preview module is configured to preview an insert of a user-selected token in response to the user positioning a token icon over a selected connector.

12. The system of claim 5, wherein the token icon corresponds to a list of selectable words, and wherein the preview module is configured to preview an addition to the list of selectable words in response to the user positioning an additional word over the token icon.

13. The system of claim 5, wherein the structured flow diagram is generated by a circuit simulator that generates visual display of a circuit in response to the user selecting a plurality of circuit elements and specifying a plurality of connections between the circuit elements, and wherein the preview module is configured to preview a modification to the circuit diagram by displaying at least one textbox indicating a circuit parameter change resulting from the modification.

14. A non-transitory computer-readable storage medium, the storage medium storing computer instructions for:

presenting a display of the structured flow diagram with a user interface, the structured flow diagram being displayed according to a predetermined visual format;

dragging an object to a drop target where it is proposed that the object be inserted into the structured flow diagram;

upon the object hovering over the proposed drop target, generating an alternative construct of the structured flow diagram that would result from the insertion of the object at the drop target in the display, wherein generating comprises showing a modification comprising one or more modified portions of the structured flow diagram due to the inserting the object at the proposed drop target in a first different visual format juxtaposed with other portions of the structured flow diagram that would not be modified by dropping the object at the proposed drop target so that the alternative construct of the structured flow diagram can be previewed prior to determining whether to incorporate the modification into the structured flow diagram at the drop target, wherein the other portions of the structured flow diagram that would not be modified by dropping the object at the proposed drop target remain being displayed in the predetermined visual format, and wherein portions of the structured flow diagram that would be modified by dropping the object at the proposed drop target are displayed in unmodified form in a second different visual format and concurrently with the modification;

dragging the object to an alternative drop target and repeating the generating step if the modification is not desired;

incorporating the modification into the structured flow diagram if the modification is desired;

wherein the predetermined visual format, the first different format, and second different visual format are of different kinds of lines or different color schemes, and wherein the structured flow diagram is a grammar builder that graphically represents speech responses in a voice application defined by at least one grammar rule represented by a token icon and at least one connector connected to the token icon and another token icon, and wherein the instruction for generating comprises an instruction for generating a preview of an insertion of a token by positioning a token icon over a selected connector.

15. The storage medium of claim 14, wherein the instruction for generating comprises an instruction for performing at least one drag-and-drop operation whereby an object from a predetermined set of objects is selected and moved in relation to other objects in the displayed structured flow diagram.

16. The storage medium of claim 14, wherein the structured flow diagram is a grammar builder that graphically represents speech responses in a voice application defined by at least one grammar rule represented by a token icon and at least one connector connected between the token icon and at least one other token icon, wherein the token icon corresponds a list of words, and wherein the instruction for generating comprises an instruction for generating a preview of an addition to the list of words by positioning a selected word over the token icon.

* * * * *